(12) United States Patent
Lee et al.

(10) Patent No.: US 8,883,406 B2
(45) Date of Patent: Nov. 11, 2014

(54) METHOD FOR USING A PURGE RING WITH SPLIT BAFFLES IN PHOTONIC THERMAL PROCESSING SYSTEMS

(71) Applicant: Lam Research Corporation, Fremont, CA (US)

(72) Inventors: James Lee, Damascus, OR (US); Lisa Gytri, Tigard, OR (US)

(73) Assignee: Novellus Systems, Inc., San Jose, CA (US)

( * ) Notice: Subject to any disclaimer, the term of this patent is extended or adjusted under 35 U.S.C. 154(b) by 0 days.

(21) Appl. No.: 14/072,176

(22) Filed: Nov. 5, 2013

(65) Prior Publication Data

US 2014/0065557 A1    Mar. 6, 2014

Related U.S. Application Data

(62) Division of application No. 13/090,478, filed on Apr. 20, 2011, now Pat. No. 8,608,035.

(60) Provisional application No. 61/326,870, filed on Apr. 22, 2010.

(51) Int. Cl.
- *G03F 7/20* (2006.01)
- *F15D 1/00* (2006.01)
- *G03B 27/52* (2006.01)
- *B08B 15/00* (2006.01)

(52) U.S. Cl.
CPC .............. *F15D 1/0005* (2013.01); *G03B 27/52* (2013.01); *B08B 15/00* (2013.01)
USPC .......................................................... 430/325

(58) Field of Classification Search
CPC .......... G03B 27/52; G03F 7/20; F15D 1/0005
USPC ................................. 430/325; 137/1; 222/566
See application file for complete search history.

(56) References Cited

U.S. PATENT DOCUMENTS

| | | |
|---|---|---|
| 5,914,050 A | 6/1999 | Comita et al. |
| 7,265,061 B1 | 9/2007 | Cho et al. |
| 7,554,103 B2 | 6/2009 | Rocha-Alvarez et al. |
| 2006/0286820 A1 | 12/2006 | Singh et al. |
| 2008/0056975 A1 | 3/2008 | Won et al. |

FOREIGN PATENT DOCUMENTS

| | | |
|---|---|---|
| KR | 20130064071 A | 6/2013 |
| WO | WO 2011/133782 A2 | 10/2011 |

OTHER PUBLICATIONS

Notification of Transmittal of the International Search Report and the Written Opinion of the International Searching Authority for PCT/US2011/033448 dated Apr. 21, 2011; 8 pages.
U.S. Appl. No. 13/090,478, Office Action mailed May 17, 2013.

(Continued)

*Primary Examiner* — Brittany Raymond

(57) ABSTRACT

A method for supplying a first gas and a second gas using a purge ring in a photonic processing system includes arranging a first layer and a second layer to define a first plenum and a first baffle, arranging the second layer and a third layer to define a second plenum and a second baffle, receiving a first gas at the first plenum that flows through the first plenum and the first baffle to an inner region, and receiving a second gas at the second plenum that flows through the second plenum and the second baffle to the inner region. The second baffle is one of less restrictive and more restrictive than the first baffle.

15 Claims, 9 Drawing Sheets

(56) References Cited

OTHER PUBLICATIONS

U.S. Appl. No. 11/115,576, filed Apr. 26, 2005, Krishna Shrinivasan et al.

U.S. Appl. No. 11/391,134, filed Mar. 28, 2006, Eugene Smargiassi et al.

U.S. Appl. No. 13/090,478, filed Apr. 20, 2011, Lee et al.

U.S. Appl. No. 13/090,478, Notice of Allowance mailed Aug. 2, 2013.

U.S. Appl. No. 13/090,478, Supplemental Notice of Allowability mailed Nov. 15, 2013.

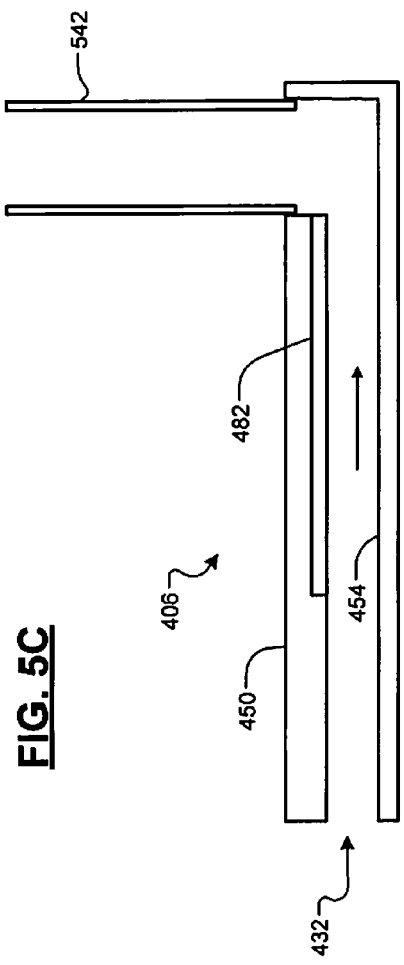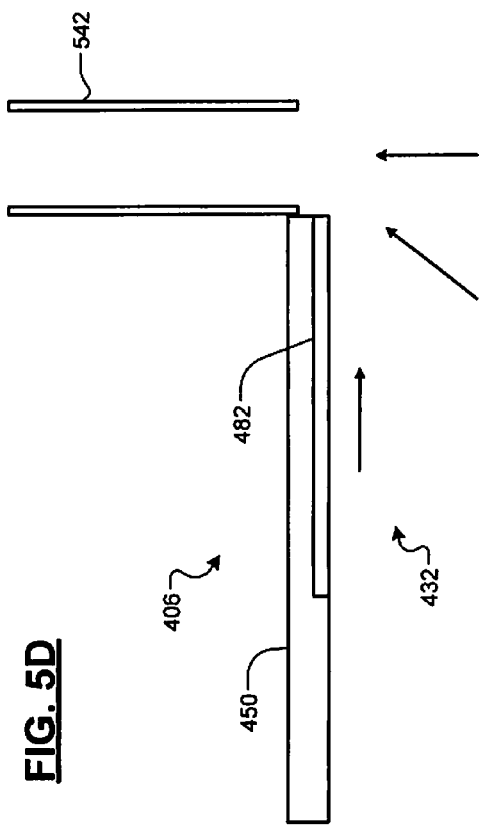

METHOD FOR USING A PURGE RING WITH SPLIT BAFFLES IN PHOTONIC THERMAL PROCESSING SYSTEMS

CROSS-REFERENCE TO RELATED APPLICATIONS

This application is a divisional of U.S. application Ser. No. 13/090,478, filed Apr. 20, 2011, which claims the benefit of U.S. Provisional Application No. 61/326,870, filed on Apr. 22, 2010. The disclosure of the above application is incorporated herein by reference in its entirety.

FIELD

The present disclosure relates to ultra-violet thermal processing systems, and more particularly to purge rings with split baffles for photonic thermal processing systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Integrated circuits typically use materials with low dielectric constants (low-k) as an intermetal and/or interlayer dielectric for conductive interconnects. Use of low-k materials tends to reduce the delay in signal propagation due to capacitive effects. As the dielectric constant decreases, the capacitance of the dielectric and the RC delay of the integrated circuit (IC) also tend to decrease.

Low k dielectrics typically refer to materials having a dielectric constant lower than silicon dioxide ($k<=4$). Typical methods for providing low-k materials include doping silicon dioxide with a hydrocarbon or fluorine. The doping methods, however, generally do not produce materials with dielectric constants lower than about 2.6. Ultra low-k (ULK) dielectric materials can be obtained by incorporating air voids within a low-k dielectric, which creates a porous dielectric material.

Methods of fabricating porous dielectrics typically involve forming a composite film with a porogen and a dielectric material. Once the composite film is formed on the substrate, the porogen component is removed, which leaves a porous dielectric matrix. Techniques for removing porogens include heating the substrate to a temperature sufficient to break down and vaporize the porogen. However, substrate temperatures generally need to be high over a long exposure period, which can damage copper containing substrates.

A porous low-k or ULK film of dielectric material can also be formed using a precursor film that contains a porogen and a structure former on a substrate. The precursor film is then exposed to ultraviolet (UV) radiation to remove the porogen. This approach tends to form porogen deposits on a window through which the UV light is transmitted. The porogen deposits inhibit UV light transmission. As a result, only a few substrates can be cured before cleaning is required. Purge rings with gas delivery baffles may be used to prevent the accumulation of ultralow-dielectric (ULK) byproducts on windows and other surfaces within a UV thermal processing (UVTP) system.

Referring now to FIG. 1, a purge ring 102 includes an inlet portion 104 and an exhaust portion 106. The inlet portion 104 comprises a side wall 108 having an inner surface 109. The exhaust portion 106 comprises a side wall 110 having an inner surface 111. The purge ring 102 provides purge gas to an inner region 112 via an inner surface 109 of the inlet portion 104 and exhausts the purge gas from the inner region 112 via the inner surface 111 of the exhaust portion 106.

The purge ring 102 further includes a plenum 120 indicated by dashed lines in FIG. 1 and a baffle 122. During periodic cleaning operations, cleaning gas flows through the plenum 120 and the baffle 122 into the inner region 112 to clean a window surface and other portions of the photonic temperature processing system.

The purge ring 102 includes a gas inlet 126 located in the inlet portion 104 at end 127. The purge ring 102 further comprises an exhaust channel 130 located in the exhaust portion 106 (indicated by dotted lines in FIG. 1). The purge ring 102 includes an exhaust opening 132 on the inner surface 111 of the exhaust portion 106. Gas and other matter (e.g., suspended particulate matter) flows from the inner region 112 into the exhaust channel 130. Gas and other matter flows into an exhaust outlet 136, which is located at end 137. Typically, an exhaust pump (not shown) provides suction to draw the gas and other matter from the inner region 112 through the exhaust channel 130 and the exhaust outlet 136. Flow arrows 140 represent the flow of the gas from the plenum 120 through the baffle 122 into the inner region 112. Flow arrows 150 represent the flow of the gas out of the inner region 112 into the exhaust channel 130.

Referring now to FIG. 2, a cross-sectional view 200 of the side wall 108 of the inlet portion 104 is presented. The side wall 108 includes a lower portion 202 and an upper portion 204 defining the plenum 120 and the baffle 122. Gas flows through the baffle 122 to the inner region 112.

Referring now to FIG. 3, an example photonic temperature processing system 300 is shown to include the purge ring 102. The photonic temperature processing system 300 includes a chamber 306 with a pedestal 308, which holds a substrate 310 such as a semiconductor wafer. A pedestal heater 312 may be used to heat the substrate 310 and other components, such as the purge ring 102. The photonic temperature processing system 300 further comprises one or more UV lamps 316 for providing UV light and heat for curing the substrate 310 located. The purge ring 102 may be located between a window 318 and the pedestal 308. The UV lamps 316 and the window 318 may be located in a lamp assembly 320.

The photonic temperature processing system 300 includes a inlet conduit 340 coupled to the gas inlet 126. An exhaust conduit 342 is coupled to the exhaust outlet 136. The photonic temperature processing system 300 further comprises a top plate 330 that is configured to support and spatially to orient the purge ring 102 and the lamp assembly 320, including the window 318.

The inlet conduit 340 and the exhaust conduit 342 may be integral with the top plate 330. Typically, the photonic temperature processing system 300 is connected to one or more gas sources 360 that provide gas through the inlet conduit 340 to the purge ring 102. The gas sources 360 may include a purge gas such as argon 362, nitrogen 364, oxygen 366, and a cleaning gas 368 such as a remote plasma cleaning (RPC) unit for providing radical oxygen gas O' to the photonic temperature processing system 300. The purge gas may be preheated by a heater 369.

During purging or cleaning, gas flows from the gas sources 360 through the inlet conduit 340 into the plenum 120, as indicated by gas flow arrow 370. The gas then passes from the plenum 120 through the baffle 122 into the inner region 112 of the purge ring 102. The gas flows through the inner region 112 as indicated by gas flow arrow 372. From the inner region 112, the gas and other matter enters the exhaust channel 130, as indicated by flow arrow 374. The gas and other matter exits the photonic temperature processing system 300 through the exhaust conduit 342. An exhaust pump 376 draws the gas and other matter from the inner region 112 through the exhaust channel 130, the exhaust outlet 136 and the exhaust conduit 342.

Although the purge ring 102 is relatively efficient at keeping the window 318 clean, it cannot prevent all porogen accumulation on the window 318. As a result, cleaning is required after processing a batch of wafers to restore UV transmission intensity through the window 318. The porogen material also may adhere to other areas of the chamber 306 and may eventually cause particles to be formed.

The most efficient known method of cleaning the window 318 is to flow cleaning gas such as remotely generated O-plasma (RPC) through the baffle 122. In the purge ring 102, the cleaning gas species flows through a restriction (the baffle 122). The restriction compresses the O-plasma and causes it to recombine into oxygen. This recombination reduces the available clean species, which restricts the effectiveness of the cleaning gas.

In order to clean the rest of the chamber 306, a second clean step is usually performed. The second clean step involves using the UV lamp 316 to create ozone throughout the chamber 306. While this approach is effective in cleaning the chamber 306, it is a lengthy process that adds a significant amount of time to each clean. Current cleaning procedures require about 5 minutes of RPC and 20 minutes of ozone, with additional overhead required to pressurize the chamber 306 between the RPC and ozone cleaning. This long clean procedure cuts system throughput, requires a large amount of gas, and does not always sufficiently clean the chamber 306 and the window 318.

SUMMARY

A purge ring for a photonic temperature processing system includes a first layer, a second layer, and a third layer. The first layer, the second layer and the third layer define an inner region. The first layer and the second layer define a first plenum and a first baffle. The first plenum receives a first gas that flows through the first plenum and the first baffle to the inner region. The second layer and the third layer define a second plenum and a second baffle. The second plenum receives a second gas that flows through the second plenum and the second baffle to the inner region. The second baffle is one of less restrictive and more restrictive than the first baffle. The first layer defines an exhaust channel to convey the first gas and the second gas out of the inner region.

In other features, the inner region is elliptical. The first baffle is located adjacent to the second baffle. The first baffle and the second baffle are arranged around more than 180° of the inner region and the exhaust channel is arranged around less than 180° of the inner region. The first baffle flows the gas at an angle with respect to a first plane including the first layer.

In other features, the first baffle and the second baffle flow the first gas and the second gas, respectively, at a first angle and a second angle, respectively, relative to a first plane including the first layer. The first gas is a purge gas. The purge gas is selected from a group including argon, oxygen and nitrogen. The second gas is a cleaning gas. The cleaning gas comprises remote plasma cleaning (RPC) gas. The first gas is a purge gas, the second gas is a cleaning gas and the first baffle is at least twice as restrictive as the second baffle.

In other features, the third layer further comprises a liner arranged between the second layer and the third layer. At least one of the first layer, the second layer and the third layer comprises a heater arranged in the exhaust channel. The third layer is removably attached to at least one of the first layer and the second layer to selectively allow the second gas to flow without restriction when the third layer is removed.

A photonic temperature processing system includes a chamber including a lamp, a pedestal to support a substrate, a window arranged between the lamp and the pedestal, and the purge ring arranged between the window and the pedestal.

A semiconductor processing system includes the photonic temperature processing system and at least one photolithography tool.

A method for supplying a first gas and a second gas using a purge ring in a photonic temperature processing system includes arranging a first layer and a second layer to define a first plenum and a first baffle; arranging the second layer and a third layer to define a second plenum and a second baffle; receiving a first gas at the first plenum that flows through the first plenum and the first baffle to an inner region; receiving a second gas at the second plenum that flows through the second plenum and the second baffle to the inner region, wherein the second baffle is one of less restrictive and more restrictive than the first baffle; and defining an exhaust channel using the first layer, wherein the exhaust channel conveys the first gas and the second gas out of the inner region.

In other features, the inner region is elliptical. The method includes arranging the first baffle adjacent to the second baffle; arranging the first baffle and the second baffle around more than 180° of the inner region; and arranging the exhaust channel around less than 180° of the inner region. The method includes flowing the first gas at an angle with respect to a first plane including the first layer using the first baffle.

In other features, the method includes flowing the first gas and the second gas at a first angle and a second angle relative to a first plane including the first layer using the first and second baffles, respectively. The first gas is a purge gas. The purge gas is selected from a group including argon, oxygen and nitrogen. The second gas is a cleaning gas. The cleaning gas comprises remote plasma cleaning (RPC) gas. The first gas is a purge gas, the second gas is a cleaning gas and the first baffle is at least twice as restrictive as the second baffle. The third layer further comprises a liner arranged between the second layer and the third layer. At least one of the first layer, the second layer and the third layer comprises a heater arranged in the exhaust channel. The third layer is removably attached to at least one of the first layer and the second layer to selectively allow the second gas to flow without restriction when the third layer is removed.

At least one of before and after treating a substrate in the photonic temperature processing system, applying photoresist to a substrate; exposing the photoresist to light; patterning the photoresist and transferring the pattern to the substrate; and selectively removing the photoresist from the substrate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIGS. 5A-5D are side cross-sectional views of various example purge rings with the split baffles according to the present disclosure;

DESCRIPTION

Figure 1:
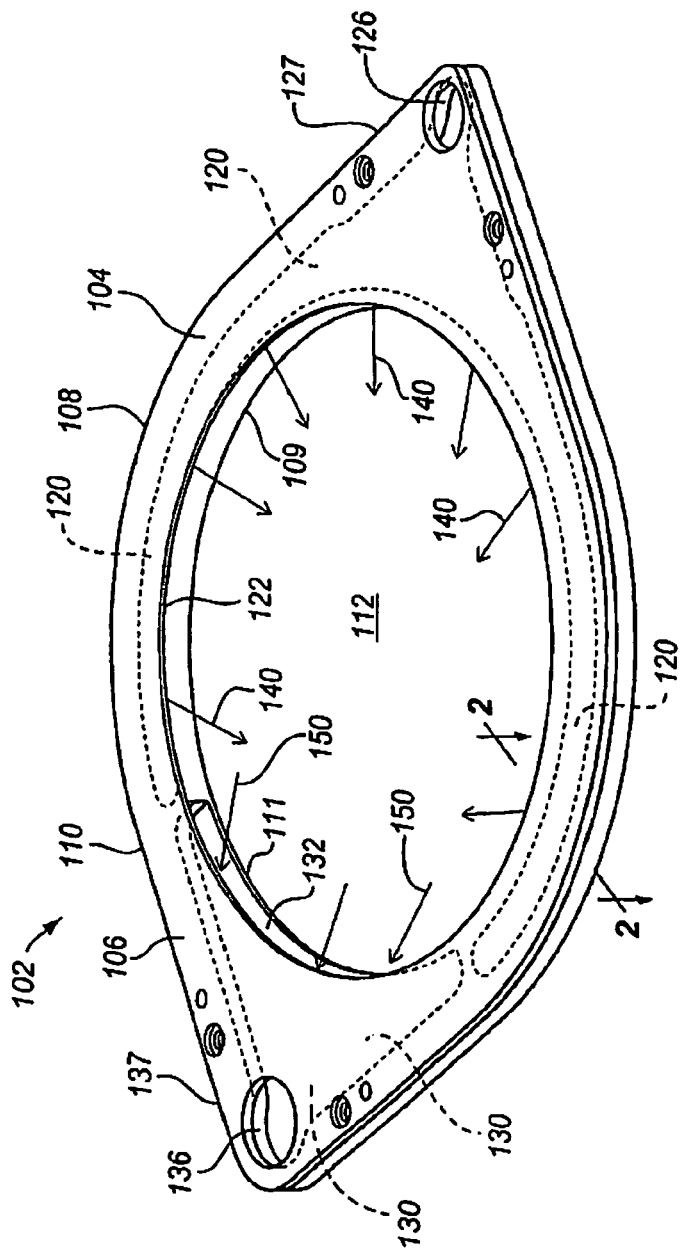
FIG. 1 is a perspective view of a purge ring with a baffle according to the prior art.
Figure 2:
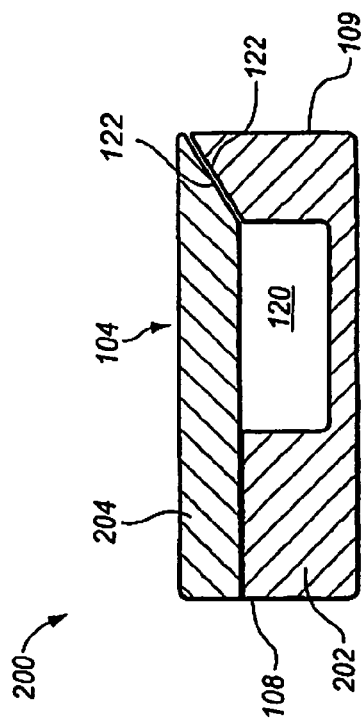
FIG. 2 is a side cross-sectional view of the purge ring and the baffle according to the prior art.
Figure 3:
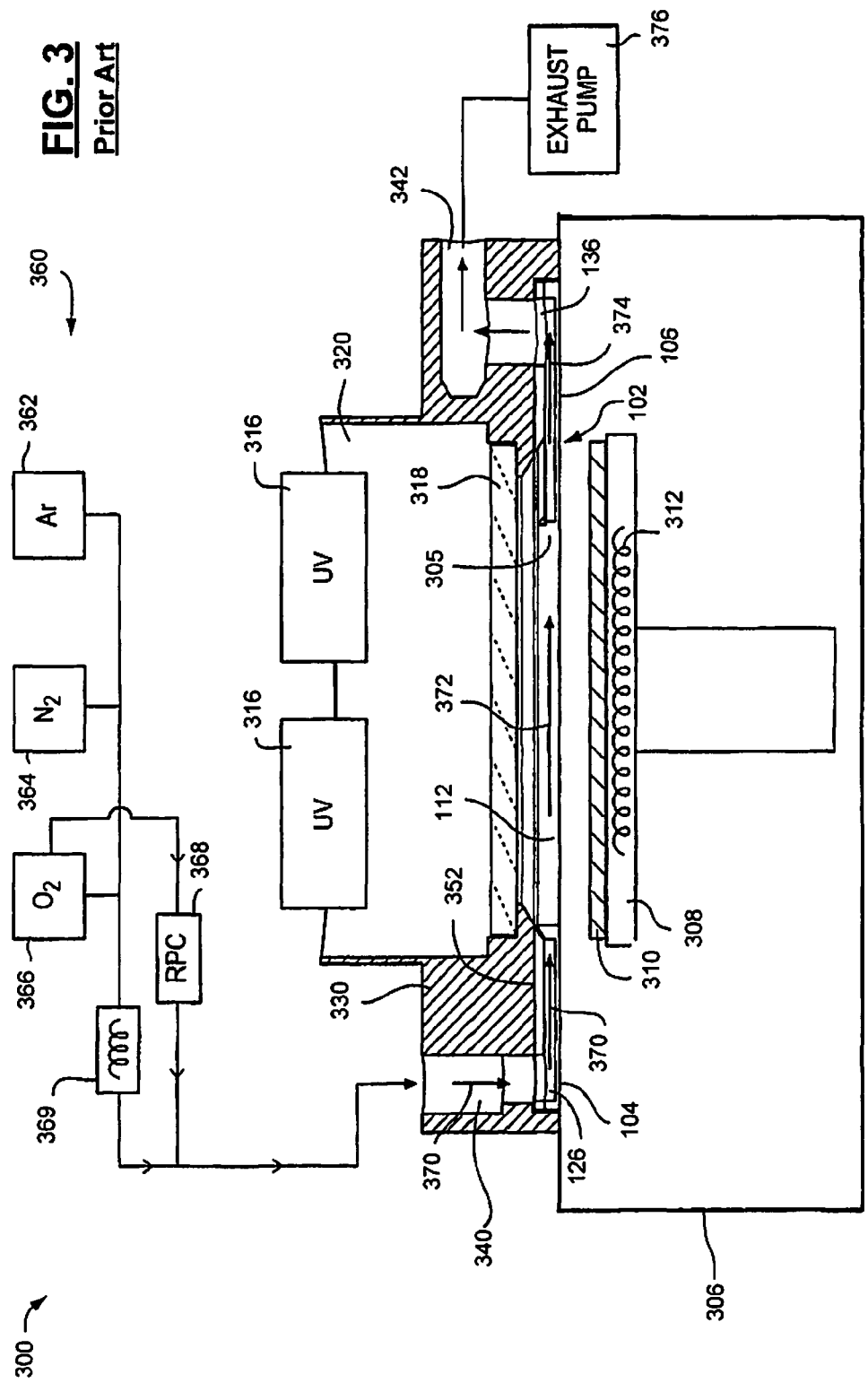
FIG. 3 is a functional block diagram of a UV temperature processing system with a purge ring according to the prior art.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

The present disclosure relates to a purge ring with split baffles for supplying purge gas and cleaning gas. The separate baffles reduce accumulation of ULK process byproducts in a chamber while improving remote plasma clean efficiency. The present disclosure will allow the photonic temperature processing system to run larger batches of wafers in between cleans, reduce the chamber clean time, and clean more areas of the process chamber. The present disclosure tends to improve the throughput of the photonic temperature processing system when running the ULK process.

Separate baffles according to present disclosure provide separate paths for the cleaning gas and the purge gas. This allows the purge gas to maintain the necessary flow characteristics to keep a window in the chamber clean for long batches while not restricting the path that the RPC species takes. As a result, the recombination of RPC species is reduced prior to reaching the chamber.

Although the present disclosure will describe curing low-k and ultra-low-k (ULK) dielectric thin films containing porogens using UV curing, the systems and methods according to the present disclosure are suitable to cure other materials and can use other wavelengths. In addition, the systems and methods described herein are also suitable for purging and cleaning other types of processing chambers that are used for treating any integrated circuit wafer. Likewise, the purge ring can be used to flow materials other than purge gas and cleaning gas. As used herein, photonic temperature processing system refers to systems using a lamp or other source of photons to cure. For example, visible, ultraviolet, infrared and other sources may be used (and combinations thereof).

Figure 4:
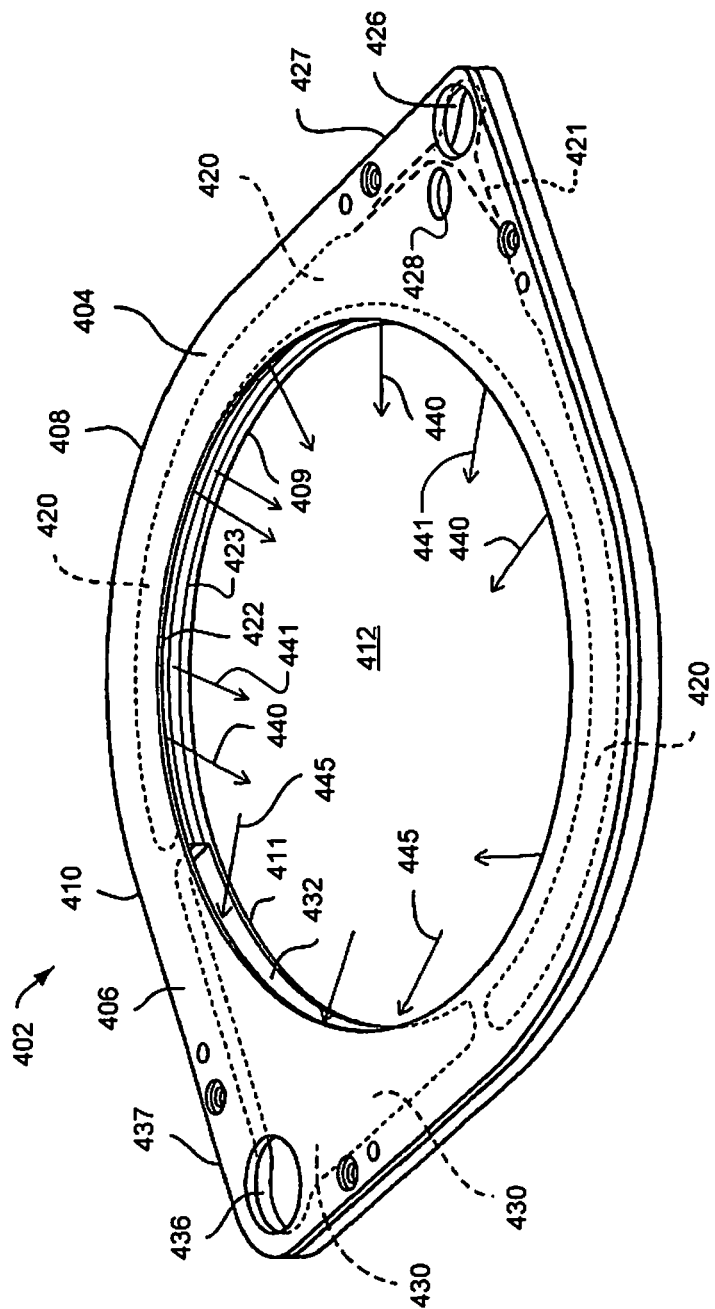
FIG. 4 is a perspective view of an example of a purge ring with split baffles according to the present disclosure.

Referring now to FIG. 4, a purge ring 402 according to the present disclosure includes an inlet portion 404 and an exhaust portion 406. The inlet portion 404 comprises side wall 408 having an inner surface 409. The exhaust portion 406 comprises side wall 410 having an inner surface 411. The purge ring 402 provides purge gas to an inner region 412 of the purge ring 402 via the inner surface 409 of the inlet portion 404 and exhausts the purge gas from the inner region 412 via the inner surface 411 of the exhaust portion 406.

The purge ring 402 further provides a first plenum 420 and a second plenum 421 indicated by dashed lines in FIG. 4. The purge ring 402 includes a first baffle 422 in fluid communication with the first plenum 420. The purge ring 402 also includes a second baffle 423 in fluid communication with the second plenum 421. Purge gas flows through the first baffle 422 into the inner region 412. Cleaning gas flows through the second baffle 423 into the inner region 412.

The purge ring 402 includes a first gas inlet 426 located in the inlet portion 404 at end 427. The purge ring 402 includes a second gas inlet 428 located in the inlet portion 404 at 427. As can be appreciated, the first and second gas inlets 426, 428 may be located in other positions on the purge ring 402 and/or located in different radial positions.

The purge ring 402 further comprises an exhaust channel 430 located in the exhaust portion 406 (indicated by dotted lines in FIG. 4). The purge ring 402 includes exhaust opening 432 in the inner surface 411 of the exhaust portion 406. Gas and other matter (e.g., suspended particulate matter) flows from the inner region 412 into the exhaust channel 430. Gas and other matter flows through the exhaust channel 430 and into exhaust outlet 436, which is located at end 437. Typically, an exhaust pump (not shown) provides suction to draw the gas and other matter from the inner region 412 through the exhaust channel 430 and the exhaust outlet 436.

Flow arrows 440 and 441 represent the flow of the gas from first and second plenums 420 and 421 through the first and second baffles 422 and 423, respectively, into the inner region 412. Flow arrows 445 represent the flow of the gas and other matter out of the inner region 412 into the exhaust channel 430. The inlet portion and first and second baffles may span greater than 180° and the exhaust portion may span less than 180°. For example, the inlet portion and first and second baffles may span about 240°-270° and the exhaust portion spans about 120°-90°, respectively, although other values may be used. While the first plenum is arranged on top and flows the purge gas and the second plenum is arranged on bottom and flows the cleaning gas, the arrangement can be reversed such that the first plenum is arranged below the second plenum.

Figure 5A:
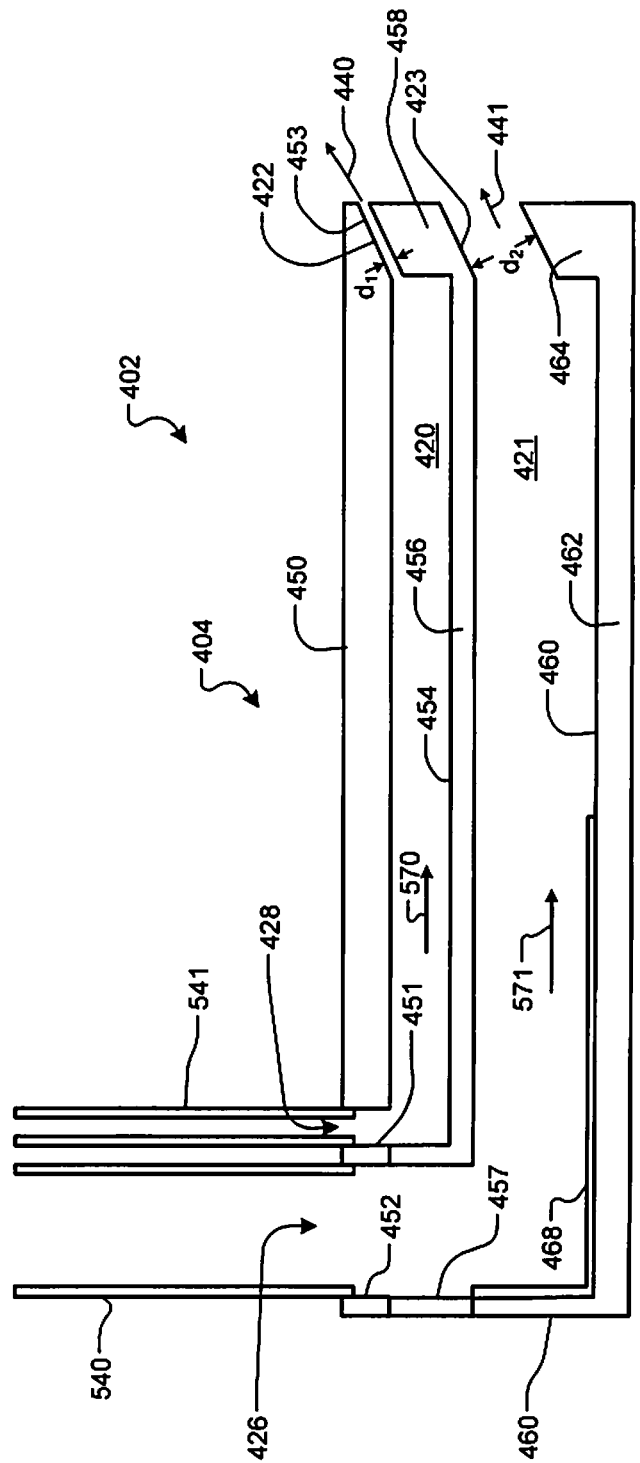

Referring now to FIG. 5A, one example of the purge ring 402 is shown to include a first layer 450. The first layer 450 defines a first opening 451 to allow purge gas to flow into the first plenum 420. The first layer 450 defines a second opening 452 to allow clean gas to flow to the second plenum 421. The first layer 450 may include an angled portion 453.

The purge ring 402 includes a second layer 454 comprising a first plenum defining portion 456 to define the first plenum 420 in conjunction with a bottom surface of the first layer 450. The second layer 454 includes an angled portion 458 extending at a first angle adjacent to the inner region 412. A bottom surface of the first layer 450 and a top surface of the second layer 454 define the first baffle 422 adjacent to the inner region 412. The second layer 454 also defines a first opening 457 to allow flow of cleaning gas into the second plenum 421.

The purge ring 402 includes a third layer 460 including a second plenum defining portion 462 to define the second plenum 421 in conjunction with a bottom surface of the second layer 454. The third layer 460 includes an angled portion 464 extending at a second angle adjacent to the inner region 412. A bottom surface of the second layer 454 and a top surface of the third layer 460 define the second baffle 423 adjacent to the inner region 412.

In some examples, the first gas inlet 426 may be in fluid communication with a source of the cleaning gas such as RPC and the second gas inlet 428 may be in fluid communication with a source of the purge gas. In some examples, the first and second angles are the same such that the gas flows through the first and second baffles 422 and 423 are parallel, although different angles can be used. In some examples, the first baffle 422 has a width $d_1$ that is less than a width $d_2$ of the second baffle 423. In some examples, the width $d_2$ of the second baffle 423 is at least 2 times the width $d_1$ of the first baffle 422. In some examples, the width $d_2$ of the second baffle 423 is at least 5 times the width $d_1$ of the first baffle 422. In some examples, the width $d_2$ of the second baffle 423 is approximately an order of magnitude greater than the width $d_1$ of the first baffle 422. In some examples, the width $d_2$ of the second baffle 423 is approximately 0.25" and the width $d_1$ of the first baffle 422 is approximately 0.030". The third layer 460 may include a liner 468 such as a quartz liner to prevent RPC recombination.

Figure 5B:
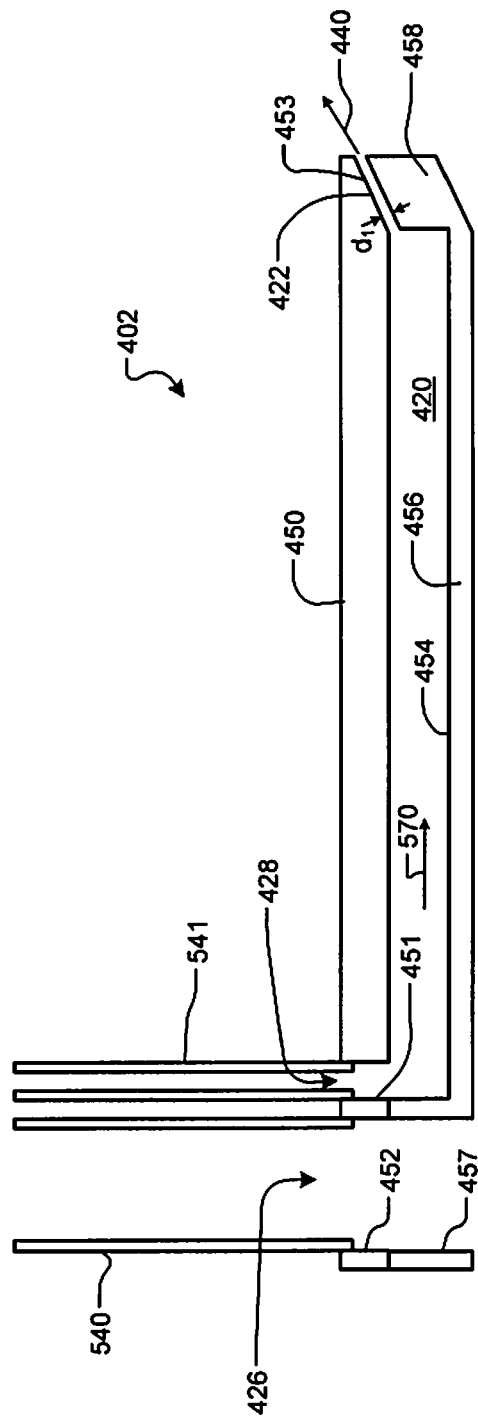

Referring now to FIG. 5B, the third layer 460 of the purge ring 402 may also be removably attached to other layers of the purge ring 402 using fasteners, a snap-fit connection or other removable attachment mechanism (not shown). This approach allows the cleaning gas to be delivered in more of a "flood" manner in order to reach the non-window areas of the chamber.

Referring now to FIGS. 5C and 5D, example of the exhaust portion are shown. In FIG. 5C, at the exhaust portion 406 at least one of the first and second layers 450 and 454 may include a heater 482. The heater 482 may be used to heat the purge gas. This may be useful in situations where the photonic temperature processing system includes multiple chambers. In FIG. 5D, the second layer 454 can be removed to draw gas and other matter over a larger area.

Figure 6:
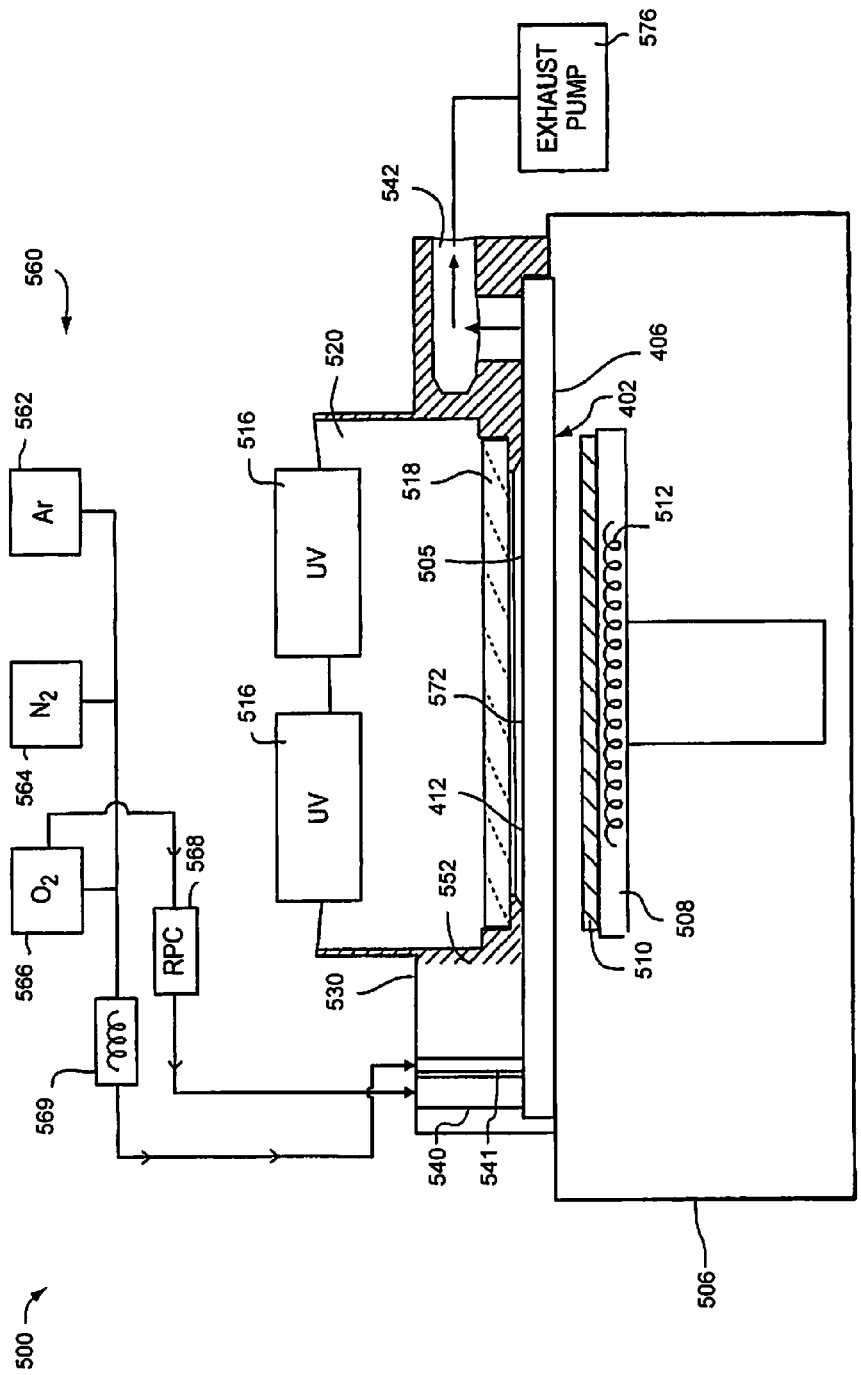
FIG. 6 is a functional block diagram a photonic temperature processing system including the purge ring of FIGS. 4 and 5 according to the present disclosure.

Referring now to FIG. 6, an example photonic temperature processing system 500 is shown to include the purge ring 402. The photonic temperature processing system 500 includes a chamber 506 with a pedestal 508, which holds a substrate 510 such as a semiconductor wafer. A pedestal heater 512 may be used to heat the substrate 510 and other components of photonic temperature processing system 500, such as the purge ring 402.

The photonic temperature processing system 500 further comprises one or more lamps 516 or other sources for providing radiation such as visible, infrared, and/or UV light and heat for curing the substrate 510. The purge ring 402 may be located between a window 518 and the pedestal 508. The lamps 516 and the window 518 may be part of a lamp assembly 520. Suitable UV lamps include a Hg linear arc lamp, a microwave-driven Hg lamp, a pulsed xenon lamp, and an excimer lamp, although other types may be used. While UV light is disclosed as an example, the lamps may supply UV, infrared, visible and/or other wavelengths. In some examples, the lamps provide predominantly UV light.

The photonic temperature processing system 500 includes a first inlet conduit 540 coupled to the first gas inlet 426 and a second inlet conduit 541 coupled to the second gas inlet 428. An exhaust conduit 542 is coupled to the exhaust outlet 436. The photonic temperature processing system 500 further comprises a top plate 530 that is configured to support and spatially to orient the purge ring 402 and the lamp assembly 520. The inlet conduits 540, 541 and the exhaust conduit 542 may be integral with top plate 530.

Typically, the photonic temperature processing system 500 is connected to one or more gas sources 560 that provide gas through the first inlet conduit 540 to the purge ring 402. The gas sources 560 may include argon 562, nitrogen 564, oxygen 566, and a cleaning gas such as a remote plasma cleaning (RPC) unit 568 for providing radical oxygen gas O' to the photonic temperature processing system 500. The purge gas may be preheated by a heater 569.

During operation, the purge gas flows from the gas sources 560 through the first inlet conduit 540 into the first plenum 420 of the inlet portion 404, as indicated by gas flow arrow 570 (FIG. 5A). The purge gas then passes from the first plenum 420 through the first baffle 422 into the inner region 412 of the purge ring 402. The purge gas and other matter flows from the inner region 412 into the exhaust channel 430 in the exhaust portion 406. The purge gas and other matter exits the photonic temperature processing system 500 through the exhaust conduit 542. An exhaust pump 576 draws the purge gas and other matter from the inner region 412 through the exhaust channel 430, the exhaust outlet 436 and the exhaust conduit 542.

During cleaning, the cleaning gas 568 flows through the second inlet conduit 541 into the second plenum 421 of the inlet portion 404, as indicated by gas flow arrow 571 (FIG. 5A). The cleaning gas then passes from the second plenum 421 through the second baffle 423 into the inner region 412 of the purge ring 402. The gas and other matter flows from the inner region 412 into the exhaust channel 430 in the exhaust portion 406.

Figure 7:
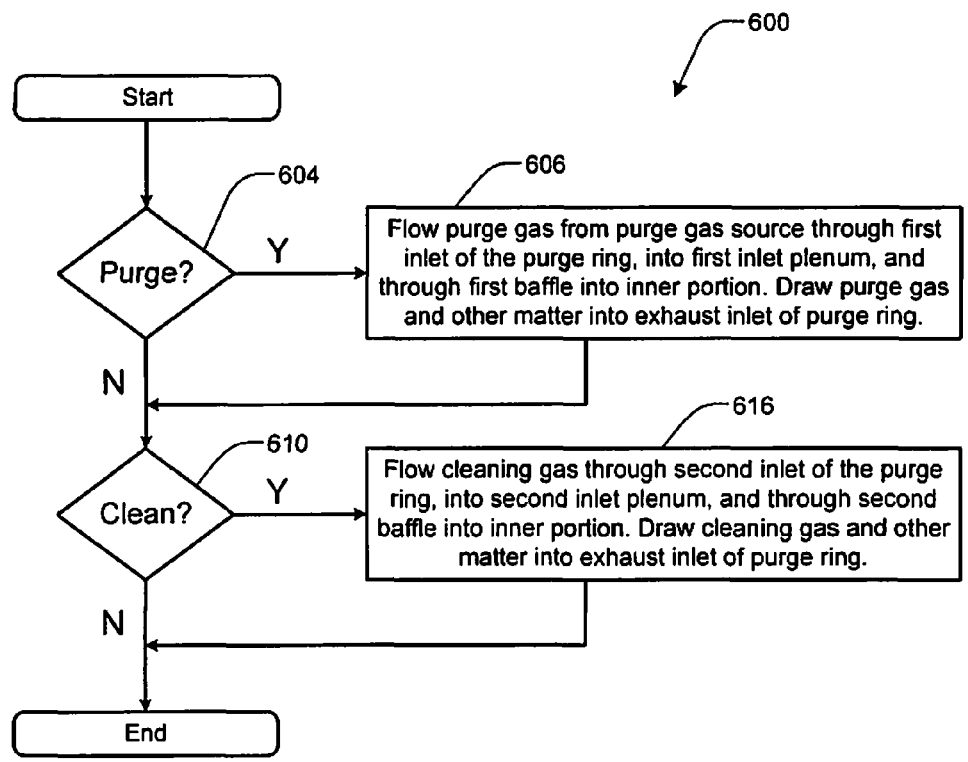
FIG. 7 illustrates a method for operating a photonic temperature processing system with the purge ring.

Referring now to FIG. 7, a method 600 for operating the purge ring with split baffles in a photonic temperature processing system is shown. When the purge gas is needed as determined at 604, the purge gas flows through the first inlet of the purge ring and into the first plenum at 606. The purge gas flows out the first baffle and into the inner region. The purge gas and other matter is drawn though the exhaust inlet of the purge ring and directed out of the system.

When the cleaning gas is needed as determined at 610, the cleaning gas flows through the second inlet of the purge ring and into the second plenum. The cleaning gas flows out the second baffle and into the inner portion. The cleaning gas and other matter is drawn though the exhaust channel of the purge ring and directed out of the system.

Figure 8:
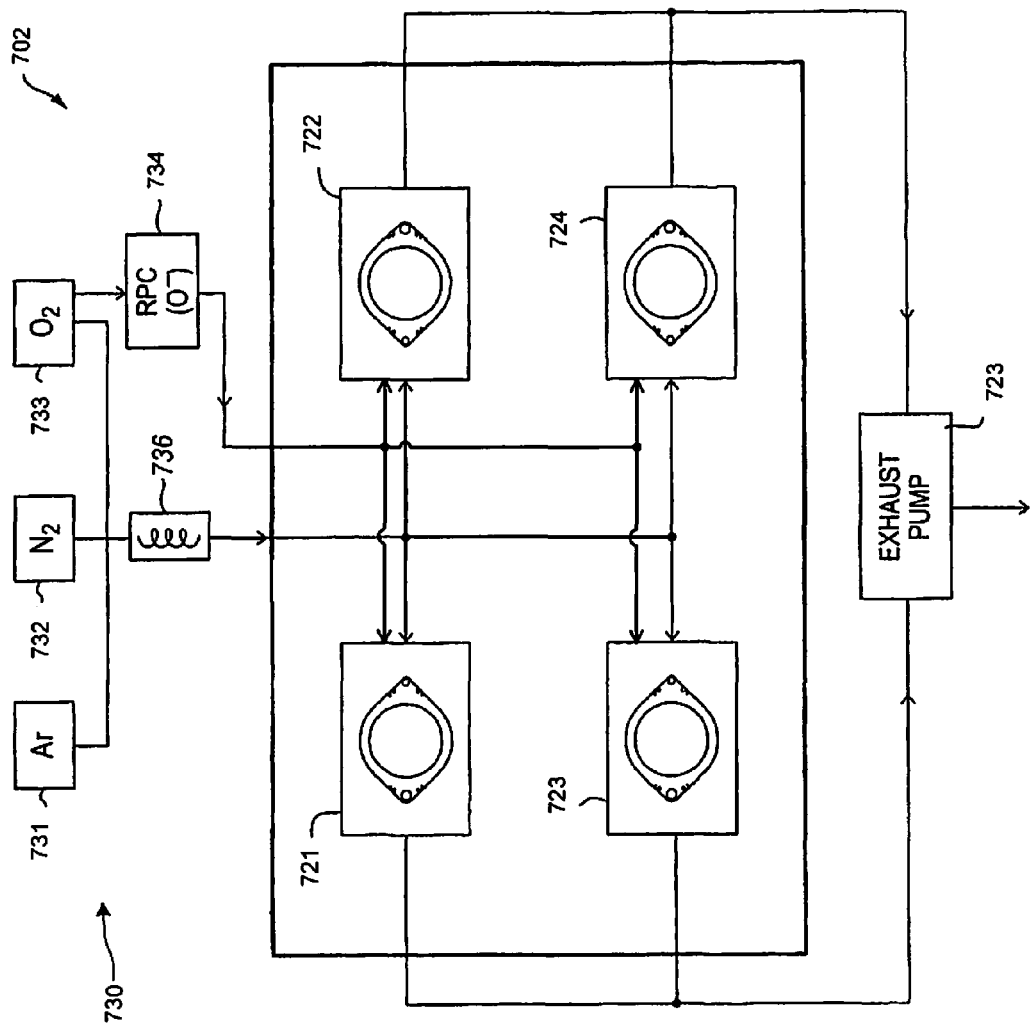
FIG. 8 illustrates delivery of purge gas and RPC and removal of exhaust from a multi-chamber photonic temperature processing system according to the present disclosure.

Referring now to FIG. 8, a multi-chamber photonic temperature processing system 702 includes N chambers or stations 721, 722, 723 and 724. Purge gas sources 730 may be provided, such as but not limited to, argon 731, nitrogen 732 and/or oxygen 733. A heater 736 may be used to heat the purge gas. A cleaning gas 734 may be provided for cleaning the photonic temperature processing system. Each of the stations 721, 722, 723 and 724 includes the purge ring 402 as described above. Filtering (not shown) and temperature conditioning may be provided between stations.

While the purge ring is described above in connection with a particular photonic temperature processing system, the purge ring may be used in other systems. For example only, suitable systems are shown in "Method and Apparatuses for Reducing Porogen Accumulation from a UV-Cure Chamber", U.S. patent application Ser. No. 11/391,134, "Single Chamber Sequential Curing of Semiconductor Wafers", U.S. patent application Ser. No. 11/115,576 filed Apr. 26, 2005, and "Method of Porogen Removal from Porous Low-k Films Using UV Radiation", U.S. patent application Ser. No. 10/672,311, filed Sep. 26, 2003, which are hereby incorporated by reference in their entirety.

The apparatus/process described hereinabove may be used in conjunction with lithographic patterning tools or processes, for example, for the fabrication or manufacture of semiconductor devices, displays, LEDs, photovoltaic panels and the like. Typically, though not necessarily, such tools/processes will be used or conducted together in a common fabrication facility. Lithographic patterning of a film typically comprises some or all of the following steps, each step enabled with a number of possible tools: (1) application of photoresist on a workpiece, i.e., substrate, using a spin-on or spray-on tool; (2) curing of photoresist using a hot plate or furnace or UV curing tool; (3) exposing the photoresist to visible or UV or x-ray light with a tool such as a wafer stepper; (4) developing the resist so as to selectively remove resist and thereby pattern it using a tool such as a wet bench; (5) transferring the resist pattern into an underlying film or workpiece by using a dry or plasma-assisted etching tool; and (6) removing the resist using a tool such as an RF or microwave plasma resist stripper.

Another aspect of the invention is an apparatus configured to accomplish the methods described herein. A suitable apparatus includes hardware for accomplishing the process operations and a system controller having instructions for controlling process operations in accordance with the present invention. The system controller will typically include one or more memory devices and one or more processors configured to execute the instructions so that the apparatus will perform a method in accordance with the present invention. Machine-readable media containing instructions for controlling process operations in accordance with the present invention may be coupled to the system controller.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for supplying a first gas and a second gas using a purge ring in a photonic processing system, comprising:
   arranging a first layer and a second layer to define a first plenum and a first baffle;
   arranging the second layer and a third layer to define a second plenum and a second baffle;
   receiving a first gas at the first plenum that flows through the first plenum and the first baffle to an inner region; and
   receiving a second gas at the second plenum that flows through the second plenum and the second baffle to the inner region, wherein the second baffle is one of less restrictive and more restrictive than the first baffle.

2. The method of claim 1, further comprising defining an exhaust channel using the first layer, wherein the exhaust channel conveys the first gas and the second gas out of the inner region and wherein the inner region is elliptical.

3. The method of claim 2, further comprising:
   arranging the first baffle adjacent to the second baffle;
   arranging the first baffle and the second baffle around more than 180° of the inner region; and
   arranging the exhaust channel around less than 180° of the inner region.

4. The method of claim 2, further comprising flowing the first gas at an angle with respect to a first plane including the first layer using the first baffle.

5. The method of claim 2, further comprising flowing the first gas and the second gas at a first angle and a second angle relative to a first plane including the first layer using the first and second baffles, respectively.

6. The method of claim 2, wherein at least one of the first layer, the second layer and the third layer comprises a heater arranged in the exhaust channel.

7. The method of claim 1, wherein the first gas is a purge gas.

8. The method of claim 7, wherein the purge gas is selected from a group including argon, oxygen and nitrogen.

9. The method of claim 1, wherein the second gas is a cleaning gas.

10. The method of claim 9, wherein the cleaning gas comprises remote plasma cleaning (RPC) gas.

11. The method of claim 1, wherein the first gas is a purge gas, the second gas is a cleaning gas and the first baffle is at least twice as restrictive as the second baffle.

12. The method of claim 1, wherein the third layer further comprises a liner arranged between the second layer and the third layer.

13. The method of claim 1, wherein the third layer is removably attached to at least one of the first layer and the second layer to selectively allow the second gas to flow without restriction when the third layer is removed.

14. The method of claim 1 further comprising:
   at least one of before and after treating a substrate in the photonic temperature processing system:
      applying photoresist to a substrate;
      exposing the photoresist to light;
      patterning the photoresist and transferring the pattern to the substrate; and
      selectively removing the photoresist from the substrate.

15. The method of claim 1, wherein the photonic temperature processing system includes an ultraviolet lamp.

* * * * *